US011760828B2

(12) United States Patent
Irle et al.

(10) Patent No.: US 11,760,828 B2
(45) Date of Patent: Sep. 19, 2023

(54) TWO-COMPONENT SYSTEM FOR ELASTIC COATINGS

(71) Applicant: Covestro Deutschland AG, Leverkusen (DE)

(72) Inventors: Christoph Irle, Cologne (DE); Dieter Mager, Leverkusen (DE); Qinglan Liu, Shanghai (CN); Limin Cheng, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 368 days.

(21) Appl. No.: 16/645,870

(22) PCT Filed: Aug. 21, 2018

(86) PCT No.: PCT/CN2018/101484
§ 371 (c)(1),
(2) Date: Mar. 10, 2020

(87) PCT Pub. No.: WO2019/062383
PCT Pub. Date: Apr. 4, 2019

(65) Prior Publication Data
US 2020/0270390 A1   Aug. 27, 2020

(30) Foreign Application Priority Data
Sep. 26, 2017   (WO) ................ PCT/CN2017/103413

(51) Int. Cl.
*C08G 18/79* (2006.01)
*C08G 18/08* (2006.01)
*C08G 18/78* (2006.01)
*C08G 18/44* (2006.01)
*C08G 18/18* (2006.01)
*C08G 18/22* (2006.01)
*C08G 18/32* (2006.01)
*C08G 18/70* (2006.01)
*C08G 18/73* (2006.01)
*C09D 175/06* (2006.01)

(52) U.S. Cl.
CPC ......... *C08G 18/44* (2013.01); *C08G 18/0866* (2013.01); *C08G 18/1875* (2013.01); *C08G 18/222* (2013.01); *C08G 18/3206* (2013.01); *C08G 18/706* (2013.01); *C08G 18/73* (2013.01); *C08G 18/7837* (2013.01); *C08G 18/792* (2013.01); *C09D 175/06* (2013.01)

(58) Field of Classification Search
CPC ............ C08G 18/44; C08G 18/0866; C08G 18/1875; C08G 18/222; C08G 18/3206; C08G 18/706; C08G 18/73; C08G 18/7837; C09D 175/06

See application file for complete search history.

(56) References Cited

U.S. PATENT DOCUMENTS

| 3,487,080 | A | 12/1969 | Matsui et al. |
| 3,640,967 | A | 2/1972 | Konig et al. |
| 4,040,992 | A | 8/1977 | Bechara et al. |
| 4,265,798 | A | 5/1981 | Mishra |
| 4,288,586 | A | 9/1981 | Bock et al. |
| 4,324,879 | A | 4/1982 | Bock et al. |
| 4,379,905 | A | 4/1983 | Stemmler et al. |
| 4,419,513 | A | 12/1983 | Breidenbach et al. |
| 4,487,928 | A | 12/1984 | Richter et al. |
| 4,499,253 | A | 2/1985 | Kerimis et al. |
| 4,604,418 | A | 8/1986 | Shindo et al. |
| 4,789,705 | A | 12/1988 | Kase et al. |
| 4,960,848 | A | 10/1990 | Scholl et al. |
| 5,013,838 | A | 5/1991 | Scholl |
| 5,880,215 | A | 3/1999 | Shaffer et al. |
| 5,914,383 | A | 6/1999 | Richter et al. |
| 6,090,939 | A | 7/2000 | Richter et al. |
| 6,489,663 | B2 | 12/2002 | Ballantine et al. |
| 2003/0009047 | A1 | 1/2003 | Tillack et al. |
| 2003/0187178 | A1 | 10/2003 | Kohlstruk et al. |
| 2004/0242765 | A1 | 12/2004 | Munzmay et al. |
| 2004/0247888 | A1* | 12/2004 | Watanabe .......... C08G 18/7837 |
| | | | 428/423.1 |
| 2005/0080259 | A1 | 4/2005 | Revelant et al. |
| 2005/0123770 | A1 | 6/2005 | Kawazu et al. |
| 2006/0155095 | A1 | 7/2006 | Argyropoulos |

(Continued)

FOREIGN PATENT DOCUMENTS

| CA | 2034622 A1 | 8/1991 |
| CA | 2139535 A1 | 8/1995 |

(Continued)

OTHER PUBLICATIONS

CN-107189039_Sep. 2017_English Translation.*

(Continued)

*Primary Examiner* — Michael L Leonard
(74) *Attorney, Agent, or Firm* — THE WEBB LAW FIRM

(57) ABSTRACT

The present invention relates to a two-component system comprising a component A) comprising at least one polymeric polyol which has an OH content of ≤4.5 wt %, based on the total solids content of the polymeric polyol, and a component B) comprising at least one polyisocyanate which has a number average isocyanate group functionality of ≥4.0 to ≤10.0, based on the total solids content of the polyisocyanate, a fraction of ≤25 wt %, based on the total solids content of the polyisocyanate, of oligomers containing isocyanate groups and having a number-average molecular weight of ≤780 g/mol, and an isocyanurate group fraction of ≥5 mol % to ≤70 mol %, based on the total amount of isocyanurate groups and allophanate groups in the polyisocyanate. The invention further relates to a method for producing a coating on a substrate, to the coating obtainable by this method, and to the coated substrate.

15 Claims, No Drawings

(56) References Cited

U.S. PATENT DOCUMENTS

| | | |
|---|---|---|
| 2007/0197759 A1 | 8/2007 | Binder et al. |
| 2008/0146767 A1* | 6/2008 | Wamprecht ............ C08G 18/44 528/75 |
| 2013/0303758 A1 | 11/2013 | Lucas et al. |
| 2015/0158966 A1 | 6/2015 | Laas et al. |
| 2015/0203705 A1* | 7/2015 | Olson ................ C09D 133/066 524/507 |
| 2017/0114179 A1 | 4/2017 | Yamauchi et al. |
| 2018/0086938 A1* | 3/2018 | Schaefer ............ C08G 18/6229 |

FOREIGN PATENT DOCUMENTS

| | | | | |
|---|---|---|---|---|
| CA | 2244486 | A1 | | 2/1999 |
| CN | 104130372 | A | | 11/2014 |
| CN | 105418886 | A | | 3/2016 |
| CN | 107189039 | A | * | 9/2017 ............... B05D 7/24 |
| CN | 107189039 | A | | 9/2017 |
| DE | 3240613 | A | | 5/1984 |
| EP | 0013880 | A | | 8/1980 |
| EP | 0100129 | A | | 2/1984 |
| EP | 0469389 | A1 | | 2/1992 |
| GB | 809809 | A | | 3/1959 |
| GB | 1386399 | A | | 3/1975 |
| GB | 1391066 | A | | 4/1975 |
| GB | 2221465 | A | | 2/1990 |
| GB | 2222161 | A | | 2/1990 |
| WO | 2012007431 | A1 | | 1/2012 |
| WO | 2012013681 | A1 | | 2/2012 |
| WO | 2012089827 | A1 | | 7/2012 |

OTHER PUBLICATIONS

Challener, C., Formulating Soft-Touch Coatings: A Balancing Act, Coatings Tech, Jul. 2016.
Adam, N. et al., Polyurethanes, Ullmann's Encyclopedia of Industrial Chemistry, Electronic Release, 7th ed., Ch. 3.2-3 4, Wiley-VCH, Weinheim, 2005.
Siefken, W., Mono- und Polyisocyanate IV. Mitteilung über Polyurethane, Justus Lieigs Annalen der Chemie, vol. 562, Issue 2, p. 75-136, Apr. 20, 1949.
Meerwein, H. et al., Die Polymerisation des Tetrahydrofurans, Angew. Chem., vol. 72, Issue 24, p. 927-934, 1960.
Cinnamon, S. et al., Adhesion properties of poly(hexamethylene diisocyanate) obtained by organotin catalysis, European Polymer Journal, vol. 16, Issue 2, p. 147-148, 1980.
International Search Report, PCT/CN2018/101484, dated Nov. 7, 2018, Authorized officer: Nan Zhao.

* cited by examiner

TWO-COMPONENT SYSTEM FOR ELASTIC COATINGS

CROSS REFERENCE TO RELATED APPLICATIONS

This application is a national stage application under 35 U.S.C. § 371 of PCT/CN2018/101484, filed Aug. 21, 2018, which claims benefit of PCT/CN2017/103413, filed Sep. 26, 2017, both of which are incorporated herein by reference in their entirety.

FIELD OF THE INVENTION

The invention relates to a two-component system, more particularly for elastic coatings. A further subject is the use of a two-component system of this kind for producing a coating, more particularly an elastic coating. Further subjects of the invention, moreover, are a method for coating a substrate, the preferably elastic coating obtainable by this method, and the coated substrate.

BACKGROUND OF THE INVENTION

Elastic polyurethane coatings, especially soft-touch coatings, have over many years attained prominent position within the market. They produce a unique, soft and tactile surface and, as a result, impart a greater value to substrates made, for example, from plastics. Soft-touch coatings are used, for example, on surfaces in the interior of cars, in consumer electronics, but also in the area of consumer durables and packaging.

Whereas the initial soft-touch coatings employed commercially were formulated on the basis of solvent-borne polyurethane systems, low-emission aqueous polyurethane formulations have been in use increasingly for a number of years. Not only aqueous but also solvent-based formulations consist in general of an elastic resin component and a polyisocyanate curing agent. Employed typically in this context are resins and also curing agents which in each polymer molecule contain only a low number of or even, in the case of the resins, possibly no functional groups, in order to optimize the soft and tactile nature of the systems. As an example here, mention may be made of the formulations as described in EP 1 481 998 A2.

A fundamental challenge to the formulation both of solvent-borne and of aqueous soft-touch coatings, therefore, is that the central property of the soft surface entails an intrinsically poor chemical resistance. As examples of this, mention may be made, for example, of inadequate resistances with respect to solvents, hand cream, sun cream or insect repellents. For a long time, accordingly, there has been a desire for a fundamental improvement in these resistances.

As observed by C. Challener (Formulating Soft-Touch Coatings: A Balancing Act, Coatings Tech, July 2016; http://www.paintorg/article/formulating-soft-touch-coatings-balancing-act/), there have been many solutions described for optimizing the profile of requirements of good chemical resistance in conjunction with acceptable tactile properties.

In the literature, furthermore, there have been numerous solutions proposed that are based on employing particular optimized resin components or additives:

EP 1 529 822 A1 describes polyurethane-based soft-touch coatings whose surface properties are improved by addition of specific matting agents.

WO 2012/089827 A1 and EP 0 469 389 A1 describe elastic coatings having improved resistance, for example, towards hand cream, which are formulated on the basis of specifically optimized polyurethane resins.

Disadvantages of all of these proposed solutions are that the chemical resistance achieved is no more than adequate, and that, in addition, the improvement in resistance is achieved at the expense of an at least slight deterioration in the elasticity and tactility. A further need for improvement of the known solutions is their rather slow curing speed, which leads to a poor productivity of the coatings process under industrial coatings conditions.

Furthermore, there are few known proposed solutions to the provision of resistant and at the same time tactile coatings based, however, on particular crosslinkers.

EP 0 926 172 A2 proposes modifying the widespread standard curing agent (isocyanurate of hexamethylene diisocyanate) by means of a polyester. The result of this is an elasticization, though without improving the chemical resistance beyond the customary degree known from use of polyester-modified resins. The incorporation of polyester into the existing curing agents, moreover, results in an unwanted increase in the viscosity of the formulation.

The above-cited EP 0 469 389 A1 claims soft-touch coatings based on optimized polyurethane resins. It also describes a selection of particular curing agents based, for example, on allophanate structures, which, however, have a very low functionality of <3 and so detract from the chemical resistance in comparison to the prior art.

DETAILED DESCRIPTION OF THE INVENTION

The object of the present invention, accordingly, was to provide a two-component system which can be used to produce coatings which eliminate one or, where possible, all of the disadvantages of the coatings known in the prior art, and which exhibits at least a significantly improved curing speed and chemical resistance on the part of the coatings obtainable, while at least retaining elasticity and tactility.

This object is achieved in accordance with the invention by means of a two-component system comprising a component A) comprising at least one polymeric polyol which has an OH content of ≤4.5 wt %, based on the total solids content of the polymeric polyol, and a component B) comprising at least one polyisocyanate which has a number average isocyanate group functionality of ≥4.0 to ≤10.0, based on the total solids content of the polyisocyanate, a fraction of ≤25 wt %, preferably ≤19 wt %, based on the total solids content of the polyisocyanate, of oligomers containing isocyanate groups and having a number-average molecular weight of ≤780 g/mol, and an isocyanurate group fraction of ≥5 mol % to ≤70 mol %, based on the total amount of isocyanurate groups and allophanate groups in the polyisocyanate.

In a preferred embodiment the two-component systems comprises a component A) comprising at least one polymeric polyol which has an OH content of ≤4.5 wt %, based on the total solids content of the polymeric polyol, and a component B) comprising at least one polyisocyanate which has a number average isocyanate group functionality of ≥4.0 to ≤10.0, based on the total solids content of the polyisocyanate, a fraction of ≤25 wt %, preferably ≤19 wt %, based on the total solids content of the polyisocyanate, of oligomers containing isocyanate groups and having a number-average molecular weight of ≤780 g/mol, and an isocyanurate group fraction of ≥5 mol % to ≤70 mol %, based on the total amount of isocyanurate groups and allophanate groups in the polyisocyanate, and a content of allophanate groups of ≥30 mol % to ≤95 mol %, based on the total amount of isocyanurate groups and allophanate groups in the polyisocyanate, which are obtained by reacting an aliphatic or cycloaliphatic diisocyanate with an alcohol containing ≥2, preferably ≥3 OH groups.

Described presently for the first time is a solution for a significantly improved chemical resistance that does not imply any concessions with regard to the elastic properties. Whereas the formulations known in the prior art are composed from resins and curing agents of low to medium functionality, the present invention, surprisingly, finds a further-improved solution on the basis of high-functionality crosslinkers.

With preference, in accordance with the invention, the expressions "comprising" or "containing" mean "substantially consisting of" and more preferably "consisting of".

Component A) comprises at least one polymeric polyol which has an OH content of ≤4.5 wt %, based on the total solids content of the polymeric polyol.

The OH content is determined according to DIN EN ISO 4629-2:2016-12.

Suitable polymeric polyols are, for example, the customary polymeric polyether polyols, polyester polyols, polycarbonate polyols, polyurethane polyols and/or polyacrylate polyols which are known from polyurethane chemistry and which customarily have a number-average molecular weight of 200 to 22,000, preferably of 250 to 18,000, more preferably of 250 to 12,000. A broad overview of suitable polymeric polyols is found in, for example, N. Adam et al.: "Polyurethanes", Ullmann's Encyclopedia of Industrial Chemistry, Electronic Release, 7th ed., chap. 3.2-3.4, Wiley-VCH, Weinheim 2005.

In one preferred embodiment the polymeric polyol present at least in component A) is a polycarbonate polyol.

Polycarbonate diols of this kind may be prepared, for example, by reaction of dihydric alcohols, examples being those as exemplified below in the list of the polyhydric alcohols of molecular weight range 62 to 400 g/mol, with diaryl carbonates, such as diphenyl carbonate, for example, dialkyl carbonates, such as dimethyl carbonate, for example, or phosgene.

Polyhydroxyl compounds of the polyester carbonate type which are suitable as hydroxy-functional components are, in particular, the diols known per se containing esters groups and carbonate groups, of the kind obtainable, for example, in accordance with the teaching of DE-A 1 770 245 or WO 03/002630 by reaction of dihydric alcohols with lactones of the type exemplified below, more particularly ε-caprolactone, and subsequent reaction of the resultant polyester diols with diphenyl carbonate or dimethyl carbonate.

In a further preferred embodiment, component A) consists to an extent of ≥30 wt %, preferably ≥30 and ≤50 wt %, of the polymeric polyol, based on the total weight of component A), and the balance to 100 wt % is composed of one or more polymeric polyester, polyether, polyurethane and/or polycarbonate polyols, which are different from the polymeric polyol, and also, optionally, of one or more additives. Polyols suitable correspondingly have been identified below, and suitable additives are identified below, in the context of the description of the two-component system.

Component B) comprises at least one polyisocyanate which has a number average isocyanate group functionality of ≥4.0 to ≤10.0, based on the total solids content of the polyisocyanate, a fraction of ≤25 wt %, preferably ≤19 wt %, based on the total solids content of the polyisocyanate, of oligomers containing isocyanate groups and having a number-average molecular weight of ≤780 g/mol, and an isocyanurate group fraction of ≥5 mol % to ≤70 mol %, based on the total amount of isocyanurate groups and allophanate groups in the polyisocyanate. In one preferred embodiment Component B) comprises at least one polyisocyanate which has a number average isocyanate group functionality of ≥5.0 to ≤10.0, based on the total solids content of the polyisocyanate, a fraction of ≤20 wt %, preferably ≤19 wt %, based on the total solids content of the polyisocyanate, of oligomers containing isocyanate groups and having a number-average molecular weight of ≤780 g/mol, and an isocyanurate group fraction of ≥5 mol % to ≤70 mol %, based on the total amount of isocyanurate groups and allophanate groups in the polyisocyanate, and a fraction of allophanate groups of ≥30 mol % to ≤95 mol %, based on the total amount of isocyanurate groups and allophanate groups in the polyisocyanate, which are obtained by reacting an aliphatic or cycloaliphatic diisocyanate with diisocyanate with an alcohol containing ≥2, preferably ≥3 OH groups.

The term "polyisocyanate" as used here is a collective designation for one or more oligomers which contain two or more isocyanate groups (by which the skilled person understands free isocyanate groups of the general structure —N═C═O). These oligomers comprise at least two monomeric diisocyanate molecules, meaning that they are compounds which contain or represent a reaction product of at least two monomeric diisocyanate molecules. The monomeric diisocyanate molecules (referred to below simply as monomeric diisocyanate or else starting diisocyanate) have a general structure O═C═N—R—N═C═O, in which R typically stands for aliphatic, cycloaliphatic and/or araliphatic radicals.

The number average isocyanate group functionality of the polyisocyanate present at least in component B) is determined presently in accordance with the following formula:

$$F(GPC) = \frac{Mn(GPC)}{\frac{100 \times 42}{\% \, NCO(Titr.)}}$$

wherein the NCO content is given in % by weight and is determined titrimetrically in accordance with DIN EN ISO 11909:2007-05 and the average number molecular weight is determined by gel permeation chromatography (GPC) in accordance with DIN 55672-1:2016-03 using polystyrene as standard and tetrahydrofuran as eluent.

In a further preferred embodiment, the polyisocyanate of component B) comprises at least one oligomer which has one or more isocyanurate groups and one or more allophanate groups, which are joined chemically to one another in each case via an aliphatic, cycloaliphatic or araliphatic group having a molecular weight of ≥56 to ≤316 g/mol.

Component B exhibits a rather high viscosity, due to the high functionality of the crosslinkers, which is required to obtain the targeted set of properties. Low viscous allophanate polyisocyanates, as described e. g. in CN 1556820A/EP 1445271A1 are not suited for that purpose and fail to meet the required chemical resistance.

The advantage of this concept is that by using high-functionality polyisocyanates with oligomers which contain not only isocyanurate groups but also allophanate groups, there is a further improvement over the known formulations, in the sense that the elasticity and tactility of the surface are slightly improved and/or attain the same level, whereas the chemical resistance is improved more significantly.

The stated allophanate groups are incorporated statistically into the oligomer distribution of the isocyanurates before or during, preferably before, the isocyanuratization process.

The characteristic, cyclic isocyanurate group is shown in the following structural formula:

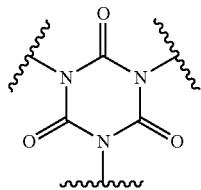 [SMILES: *n1c(=O)n(*)c(=O)n(*)c1=O]

During the isocyanuratization process, it is also possible for iminooxadiazinedione groups to be formed from three isocyanate groups in each case. The presently stated total amounts of isocyanurate groups therefore also encompass any iminooxadiazinedione groups that may have formed. The characteristic, cyclic iminooxadiazinedione group is shown in the following structural formula:

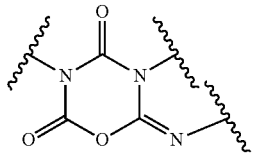 [SMILES: */N=c1/oc(=O)n(*)c(=O)n1*]

The characteristic allophanate group is shown in the following structural formula:

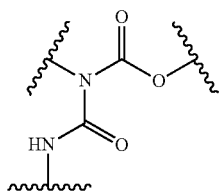 [SMILES: *NC(=O)N(*)C(=O)O*]

The polyisocyanate preferably contains more than one oligomer which has one or more isocyanurate groups and one or more allophanate groups, which are joined chemically to one another in each case via an aliphatic, cycloaliphatic or araliphatic group having a molecular weight of ≥56 to ≤316 g/mol; more preferably ≥20 to ≤90 wt % of the oligomers present overall in the polyisocyanate are hybrid structures of this kind, having one or more isocyanurate groups and one or more allophanate groups. The presence of such hybrid structures may be determined, for example, by means of gel permeation chromatography in accordance with DIN 55672-1:2007-08 using polystyrene as standard and tetrahydrofuran as eluent.

With particular preference such hybrid structures are obtained by carrying out the formation of the oligomers containing both functional groups (isocyanurates and allophanate) either simultaneously or sequentially and in the presence of the derivative prepared first in each case. The exemplary and also preferred preparation of such preferred oligomers is described in the further course of this specification.

The fractions of the oligomers with a number-average molecular weight of ≤780 g/mol are determined by means of gel permeation chromatography in accordance with DIN 55672-1:2007-08 using polystyrene as standard and tetrahydrofuran as eluent.

The amount of monomeric diisocyanates is determined by gas chromatography with an internal standard, in accordance with DIN EN ISO 10283:2007-11, and is preferably <0.5 wt %, more preferably <0.2 wt % and very preferably <0.1 wt %, based on the total weight of the polyisocyanate.

The fraction of isocyanurate and/or allophanate groups is determined by means of 13C-NMR spectroscopy, by integration of the respective carbonyl carbon atoms. In one preferred embodiment the number average isocyanate group functionality is ≥4.5 to ≤9.0, preferably ≥5.0 to ≤8.0 and more preferably from ≥5.5 to ≤7.5, based on the total solids content of the polyisocyanate. The advantage of this is that the solvent resistance is further improved and the drying is accelerated, hence further improving the productivity of the coating operation, while good soft-touch properties are maintained.

In another preferred embodiment, the fraction of the oligomers with a number-average molecular weight of ≤780 g/mol in the polyisocyanate is ≤22 wt %, preferably ≤20 wt % and more preferably ≤19 wt %, even more preferably ≤18 wt % and still more preferably ≤16 wt %, based on the total solids content of the polyisocyanate. The advantage of this is that the solvent resistance and chemical resistance of the coatings obtained are further boosted.

According to another preferred embodiment, the fraction of isocyanurate groups is ≥10 mol % to ≤60 mol %, preferably ≥15 mol % to ≤50 mol % and more preferably ≥20 mol % to ≤40 mol %, based on the total amount of isocyanurate groups and allophanate groups in the polyisocyanate.

Alternatively to the embodiment stated above, it is likewise preferred for the polyisocyanate to have a fraction of allophanate groups of ≥30 mol % to ≤95 mol %, preferably ≥40 mol % to ≤90 mol % and more preferably ≥60 mol % to ≤80 mol %, based on the total amount of isocyanurate groups and allophanate groups in the polyisocyanate.

Besides the alternative possibility there may also be particular preference, in certain cases, given to combining aforementioned fractions of isocyanurate groups and allophanate groups in such a way that their fraction adds up to 100 mol %, but cannot exceed this figure.

Particularly preferred is a two-component system comprising a component A), comprising at least one polymeric polyol which has an OH content of ≤4.5 wt %, based on the total solids content of the polymeric polyol, and a component B), comprising at least one polyisocyanate which has a number average isocyanate group functionality of ≥4.0 to ≤10.0, based on the total solids content of the polyisocyanate, a fraction of ≤25 wt %, based on the total solids content of the polyisocyanate, of oligomers containing isocyanate groups and having a number-average molecular weight of ≤780 g/mol, an isocyanurate group fraction of ≥5 mol % to ≤70 mol %, based on the total amount of isocyanurate groups and allophanate groups of the polyisocyanate, and comprises at least one oligomer which contains one or more isocyanurate groups and one or more allophanate groups, which are joined chemically to one another in each case via an aliphatic, cycloaliphatic or araliphatic group having a molecular weight of ≥56 to ≤316 g/mol.

Particularly preferred is a two-component system comprising a component A), comprising at least one polymeric polyol which has an OH content of ≤4.5 wt %, based on the total solids content of the polymeric polyol, and a component B), comprising at least one polyisocyanate which has a number average isocyanate group functionality of ≥4.0 to ≤10.0, based on the total solids content of the polyisocyanate, a fraction of ≤19 wt %, based on the total solids content of the polyisocyanate, of oligomers containing isocyanate groups and having a number-average molecular weight of ≤780 g/mol, an isocyanurate group fraction of ≥5 mol % to ≤70 mol %, based on the total amount of isocyanurate groups and allophanate groups of the polyisocyanate, and comprises at least one oligomer which contains one or more isocyanurate groups and one or more allophanate groups, which are joined chemically to one another in each case via an aliphatic, cycloaliphatic or araliphatic group having a molecular weight of ≥56 to ≤316 g/mol. In a further preferred embodiment, the one or more isocyanurate groups and one or more allophanate groups of the at least one oligomer are joined chemically to one another in each case via a linear or branched aliphatic group in the molecular weight range from ≥56 to ≤316 g/mol, preferably in each case via a 1,4-butyl, 1,5-pentyl or 1,6-hexyl group and more preferably in each case via a 1,5-pentyl or 1,6-hexyl group.

Suitable starting compounds for preparing the polyisocyanate for the two-component system of the invention are any desired monomeric diisocyanates having aliphatically, cycloaliphatically and/or araliphatically attached isocyanate groups, which may be prepared by any desired methods, as for example by phosgenation or by a phosgene-free route, such as by urethane cleavage, for example.

Suitable monomeric diisocyanates having aliphatically, cycloaliphatically and/or araliphatically attached isocyanate groups, also referred to below as starting diisocyanates, are—for example—those of the molecular weight range 140 to 400 g/mol, such as, for example, 1,4-diisocyanatobutane, 1,5-diisocyanatopentane (PDI), 1,6-diisocyanatohexane (HDI), 1,5-diisocyanato-2,2-dimethylpentane, 2,2,4- and 2,4,4-trimethyl-1,6-diisocyanatohexane, 1,8-diisocyanatooctane, 1,9-diisocyanatononane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}$-MDI), bis(isocyanatomethyl) norbornane (NBDI), 1,3- and 1,4-bis(isocyanatomethyl) cyclohexane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (XDI), 1,3- and 1,4-bis(1-isocyanato-1-methylethyl)benzene (TMXDI), bis(4-(1-isocyanato-1-methylethyl)phenyl) carbonate, 1,3- and 1,4-phenylene diisocyanate, 2,4- and 2,6-tolylene diisocyanate and also any desired mixtures of these isomers, diphenylmethane 2,4'- and/or 4,4'-diisocyanate and naphthylene 1,5-diisocyanate and also any desired mixtures of such diisocyanates. Further diisocyanates likewise suitable are additionally found, for example, in Justus Liebigs Annalen der Chemie, 562, 1949, 75-136.

Preferred as starting diisocyanates are linear or branched, aliphatic or cycloaliphatic diisocyanates, more preferably linear or branched aliphatic diisocyanates, and more preferably linear aliphatic diisocyanates of the type stated. Especially preferred starting diisocyanates are 1,5-diisocyanatopentane and/or 1,6-diisocyanatohexane.

Where mixtures of different starting diisocyanates are employed, it is especially preferred for ≤30 wt %, preferably ≤10 wt % and more preferably ≥0 to ≤5 wt % of the starting diisocyanates employed overall to be cycloaliphatic diisocyanates.

The starting diisocyanates may be reacted by various modification processes, which are known per se, to form polyisocyanates for the two-component system of the invention.

Suitable hydroxy-functional compounds for preparing the polyisocyanates are, for example, any desired mono- or polyhydric alcohols having up to 14 carbon atoms, preferably 2 to 6 carbon atoms, such as, for example, the mono- or polyhydric alcohols stated below as suitable hydroxy-functional catalyst solvents, and also tetrahydrofurfuryl alcohol, the isomeric pentanediols, hexanediols, heptanediols and octanediols, 1,10-decanediol, 1,2- and 1,4-cyclohexanediol, 1,4-cyclohexanedimethanol, 4,4'-(1-methylethylidene)biscyclohexanol, 1,1,1-trimethylolethane, 1,2,6-hexanetriol, 1,1,1-trimethylolpropane, 2,2-bis(hydroxymethyl)-1,3-propanediol, bis(2-hydroxyethyl) hydroquinone, 1,2,4- and 1,3,5-trihydroxycyclohexane or 1,3,5-tris(2-hydroxyethyl) isocyanurate, but also simple ester alcohols, such as hydroxypivalic acid neopentyl glycol ester, for example.

Suitable hydroxy-functional compounds for preparing the polyisocyanates are also the polyhydroxyl compounds of relatively high molecular weight that are known per se, being of the polyester, polycarbonate, polyestercarbonate or polyether type, more particularly those of the molecular weight range 200 to 2000 g/mol.

Polyester polyols suitable as hydroxy-functional compounds are, for example, those having an average molecular weight, as may be calculated from functionality and hydroxyl number, of 200 to 4000 g/mol, preferably of 250 to 2500 g/mol, having a hydroxyl group content of 1 to 21 wt %, preferably 2 to 18 wt %, as may be prepared in a conventional way by reaction of polyhydric alcohols, examples being those stated above with 2 to 14 carbon atoms, with sub-stoichiometric amounts of polybasic carboxylic acids, corresponding carboxylic anhydrides, corresponding polycarboxylic esters of lower alcohols or lactones.

The acids or acid derivatives that are used for preparing the polyester polyols may be aliphatic, cycloaliphatic and/or aromatic in nature and may optionally be substituted—by halogen atoms, for example—and/or unsaturated. Examples of suitable acids are, for example, polybasic carboxylic acids of the molecular weight range 118 to 300 g/mol or derivatives thereof such as, for example, succinic acid, adipic acid, sebacic acid, phthalic acid, isophthalic acid, trimellitic acid, phthalic anhydride, tetrahydrophthalic acid, maleic acid, maleic anhydride, dimeric and trimeric fatty acids, dimethyl terephthalate and bisglycol terephthalate.

For preparing the polyester polyols it is also possible to use any desired mixtures of these exemplified starting compounds.

One kind of polyester polyols which can be used with preference as hydroxy-functional compound are those of the kind preparable in a conventional way from lactones and simple polyhydric alcohols, such as those exemplified above, for example, as starter molecules, with ring opening. Suitable lactones for preparing these polyester polyols are, for example, β-propiolactone, γ-butyrolactone, γ- and δ-valerolactone, ε-caprolactone, 3,5,5- and 3,3,5-trimethyl-caprolactone, or any desired mixtures of such lactones.

Polyhydroxyl compounds of the polycarbonate type that are suitable as hydroxy-functional compounds are, in particular, the polycarbonate diols which are known per se, of the kind preparable, for example, by reaction of dihydric alcohols—for example, those as exemplified above in the list of polyhydric alcohols of the molecular weight range 62 to 400 g/mol—with diaryl carbonates, such as diphenyl carbonate, for example, dialkyl carbonates, such as dimethyl carbonate, for example, or phosgene.

Polyhydroxyl compounds of the polyester carbonate type that are suitable as hydroxy-functional compounds are, in particular, the conventional diols containing ester groups and carbonate groups, of the kind obtainable, for example, in accordance with the teaching of DE-A 1 770 245 or WO 03/002630, by reaction of dihydric alcohols with lactones of the type exemplified above, more particularly ε-caprolactone, and subsequent reaction of the resultant polyester diols with diphenyl carbonate or dimethyl carbonate.

Polyether polyols suitable as hydroxy-functional compounds are, in particular, those with an average molecular weight, as may be calculated from functionality and hydroxyl number, of 200 to 4000 g/mol, preferably 250 to 2500 g/mol, having a hydroxyl group content of 0.8 to 25 wt %, preferably 1.8 to 20 wt %, of the kind obtainable in a conventional way through alkoxylation of suitable starter molecules. For preparing these polyether polyols it is possible as starter molecules to use any desired polyhydric alcohols, such as the simple polyhydric alcohols described above and having 2 to 14 carbon atoms. Alkylene oxides suitable for the alkoxylation reaction are, in particular, ethylene oxide and propylene oxide, which in the alkoxylation reaction may be used in any order or else in a mixture.

Suitable polyether polyols are also the polyoxytetramethylene glycols which are known per se, of the kind obtainable, for example, by the method of H. Meerwein et al., Angew. Chem. 72, 1960, 927-934 by polymerization of tetrahydrofuran.

Preferred hydroxy-functional compounds are the aforementioned simple polyhydric alcohols, ester alcohols or ether alcohols, of the molecular weight range 62 to 400 g/mol. Particularly preferred are the diols and/or triols having 2 to 6 carbon atoms, as stated above within the list of the simple polyhydric alcohols. Especially preferred hydroxy-functional compounds are 1,2-ethanediol, 1,2-propanediol, 1,3-propanediol, 1,3-butanediol, 1,4-butanediol, 1,6-hexanediol, and/or 1,1,1-trimethylolpropane.

In a further preferred embodiment, the polyisocyanate is obtained by oligomerization of at least one aliphatic, cycloaliphatic or araliphatic monomeric diisocyanate having a molecular weight of ≥140 to ≤400 g/mol, and at least one hydroxy-functional compound having an OH functionality of ≥2 and ≤6 in the presence of a catalyst.

The hydroxy-functional compound preferably has an OH functionality of ≥3 and ≤5 and a molecular weight of ≥85 to ≤2000 g/mol, more preferably an OH functionality of ≥3 and ≤5 and a molecular weight of ≥130 to ≤500 g/mol.

The starting diisocyanates and hydroxy-functional compounds are reacted preferably in an equivalents ratio of isocyanate groups to hydroxyl groups of 4:1 to 200:1, preferably of 5:1 to 50:1 and more preferably 5:1 to 40:1, in the presence of at least one suitable catalyst of the type stated.

The equivalents ratio of isocyanate groups to isocyanate-reactive groups is selected within the stated limits, depending on the nature of the starting diisocyanate used and/or mixture of starting diisocyanates used, and on the nature, more particularly the molecular weight, of the hydroxy-functional compound used, always in such a way that the resulting process products, freed very largely from starting diisocyanates, are polyisocyanates which have a fraction of ≤25 wt %, preferably ≤19 wt % of oligomers having a molecular weight ≤780 g/mol, as may be determined by the skilled person using, for example, above-stated GPC analysis.

Suitable catalysts for preparing polyisocyanates for the two-component system of the invention are, for example, simple tertiary amines, such as, for example, triethylamine, tributylamine, N,N-dimethylaniline, N-ethylpiperidine, N,N'-dimethylpiperazine, or tertiary phosphines, such as triethylphosphine, tributylphosphine or dimethylphenylphosphine, for example. Other suitable catalysts are the tertiary hydroxyalkylamines described in GB 2 221 465, such as triethanolamine, N-methyldiethanolamine, dimethylethanol amine, N-isopropyldiethanolamine and 1-(2-hydroxyethyl)pyrrolidine, for example, or the catalyst systems known from GB 2 222 161, which consist of mixtures of tertiary bicyclic amines, such as DBU, for example, with simple aliphatic alcohols of low molecular weight.

Likewise suitable as catalysts are a multiplicity of different metal compounds. Examples of those suitable are the octoates and naphthenates, as described as catalysts in DE-A 3 240 613, of manganese, iron, cobalt, nickel, copper, zinc, zirconium, cerium or lead, or mixtures thereof with acetates of lithium, sodium, potassium, calcium or barium; the sodium and potassium salts, known from DE-A 3 219 608, of linear or branched alkanecarboxylic acids having up to 10 carbons, such as those of propionic acid, butyric acid, valeric acid, caproic acid, heptanoic acid, caprylic acid, pelargonic acid, capric acid and undecylic acid; the alkali metal or alkaline earth metal salts, known from EP-A 0 100 129, of aliphatic, cycloaliphatic or aromatic mono- and polycarboxylic acids having 2 to 20 carbons, such as sodium benzoate or potassium benzoate, for example; the alkali metal phenoxides known from GB 1 391 066 A and GB 1 386 399 A, such as sodium phenoxide or potassium phenoxide, for example; the alkali metal and alkaline earth metal oxides, hydroxides, carbonates, alkoxides and phenoxides known from GB 809 809, alkali metal salts of enolizable compounds, and also metal salts of weak aliphatic and/or cycloaliphatic carboxylic acids, such as, for example, sodium methoxide, sodium acetate, potassium acetate, sodium acetoacetate, lead 2-ethylhexanoate and lead naphthenate; the basic alkali metal compounds, complexed with crown ethers or polyether alcohols, which are known from EP-A 0 056 158 and EP-A 0 056 159, such as complexed sodium or potassium carboxylates, for example; the pyrrolidinone potassium salt known from EP-A 0 033 581; the monocyclic or polycyclic complex compounds of titanium, zirconium and/or hafnium that are known from EP-A 2 883 895, such as, for example, zirconium tetra-n-butylate, zirconium tetra-2-ethylhexanoate and zirconium tetra-2-ethylhexylate; and also tin compounds of the type described in European Polymer Journal, 16, 1979, 147-148, such as, for example, dibutyltin dichloride, diphenyltin dichloride, triphenylstannanol, tributyltin acetate, tributyltin oxide, tin octoate, dibutyl(dimethoxy)stannane and tributyltin imidazolate.

Other catalysts suitable for preparing the polyisocyanates are, for example, the quaternary ammonium hydroxides known from DE-A 1 667 309, EP-A 0 013 880 and EP-A 0 047 452, such as, for example, tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water on to 1,4-diazabicyclo[2.2.2]octane); the quaternary hydroxyalkylammonium hydroxides known from EP-A 37 65 or EP-A 10 589, such as, for example, N,N,N-trimethyl-N-(2-hydroxyethyl) ammonium hydroxide, the trialkylhydroxyalkylammonium carboxylates known from DE-A 2631733, EP-A 0 671 426, EP-A 1 599 526 and U.S. Pat. No. 4,789,705, such as, for example, N,N,N-trimethyl-N-2-hydroxypropyl ammonium p-tert-butylbenzoate and N,N,N-trimethyl-N-2-hydroxypropylammonium 2-ethylhexanoate; the quaternary benzylammonium carboxylates known from EP-A 1 229 016, such as, for example, N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl) ammonium-2-ethylhexanoate or N,N,N-tributyl-N-(4-methoxybenzyl) ammonium pivalate; the tetra-substituted ammonium α-hydroxycarboxylates known from WO 2005/087828, such as, for example, tetramethylammonium lactate; the quaternary ammonium or phosphonium fluorides known from EP-A 0 339 396, EP-A 0 379 914 and EP-A 0 443 167, such as, for example, N-methyl-N,N,N-trialkylammonium fluorides with $C_8$-$C_{10}$ alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride; the quaternary ammonium and phosphonium polyfluorides known from EP-A 0 798 299, EP-A 0 896 009 and EP-A 0 962 455, such as, for example, benzyltrimethylammonium hydrogenpolyfluoride; the tetraalkylammonium alkylcarbonates known from EP-A 0 668 271, which are obtainable by reaction of tertiary amines with dialkyl carbonates; or quaternary ammonioalkylcarbonates with betaine structure; the quaternary ammonium hydrogencarbonates known from WO 1999/023128, such as, for example, choline bicarbonate; the quaternary ammonium salts obtainable from tertiary amines and alkylating esters of phosphorus acids, known from EP 0 102 482, such as, for example, reaction products of triethylamine, DABCO or N-methylmorpholine with dimethyl methanephosphonate; or the tetra-substituted ammonium salts of lactams that are known from WO 2013/167404, such as, for example, trioctylammonium caprolactamate or dodecyltrimethylammonium caprolactamate.

These catalysts may be used either individually or in the form of any desired mixtures with one another.

Preferred catalysts are ammonium and phosphonium salts of the type specified above, more particularly trialkylhydroxyalkylammonium carboxylates, benzylammonium carboxylates, quaternary ammonium hydroxides, hydroxyalkylammonium hydroxides, ammonium or phosphonium fluorides, and also ammonium and phosphonium polyfluorides of the type stated.

Particularly preferred trimerization catalysts are the quaternary ammonium hydroxides and also ammonium and phosphonium polyfluorides of the type stated.

In the preparation of the polyisocyanates for the two-component system of the invention, the catalyst is employed generally in a concentration, based on the amount of the starting diisocyanates used, of 0.0005 to 5.0 wt %, preferably of 0.0010 to 2.0 wt % and more preferably of 0.0015 to 1.0 wt %.

The addition of the catalysts to the starting diisocyanates is made preferably in bulk. To improve their compatibility, however, the stated catalysts may optionally also be used in solution in a suitable organic solvent. The degree of dilution of the catalyst solutions in this case may be selected freely within a very broad range. Catalyst solutions typically acquire catalytic activity from a concentration of 0.01 wt % upwards.

Suitable catalyst solvents are, for example, solvents that are inert towards isocyanate groups, such as, for example, hexane, toluene, xylene, chlorobenzene, ethyl acetate, butyl acetate, diethylene glycol dimethyl ether, dipropylene glycol dimethyl ether, ethylene glycol monomethyl ether acetate, ethylene glycol monoethyl ether acetate, diethylene glycol ethyl ether acetate, diethylene glycol butyl ether acetate, propylene glycol monomethyl ether acetate, 1-methoxy-prop-2-yl acetate, 3-methoxy-n-butyl acetate, propylene glycol diacetate, acetone, methyl ethyl ketone, methyl isobutyl ketone, cyclohexanone, lactones, such as β-propiolactone, γ-butyrolactone, ε-caprolactone and ε-methylcaprolactone, and also solvents such as N-methylpyrrolidone and N-methylcaprolactam, 1,2-propylene carbonate, methylene chloride, dimethyl sulfoxide, triethyl phosphate or any desired mixtures of such solvents.

Where catalyst solvents are employed in the preparation of suitable polyisocyanurate polyisocyanates, preference is given to using catalyst solvents which carry groups that are reactive towards isocyanates, and which can be incorporated into the polyisocyanurate polyisocyanate. Examples of such solvents are mono- or polyhydric simple alcohols, such as methanol, ethanol, n-propanol, isopropanol, n-butanol, n-hexanol, 2-ethyl-1-hexanol, ethylene glycol, propylene glycol, the isomeric butanediols, 2-ethyl-1,3-hexanediol or glycerol; ether alcohols, such as 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid polyethylene glycols, polypropylene glycols, mixed polyethylene/polypropylene glycols and also their monoalkyl ethers, of relatively high molecular weight; ester alcohols, such as ethylene glycol monoacetate, propylene glycol monolaurate, glyceryl mono- and diacetate, glyceryl monobutyrate or 2,2,4-trimethyl-1,3-pentanediol monoisobutyrate; unsaturated alcohols such as allyl alcohol, 1,1-dimethyl allyl alcohol or oleyl alcohol; araliphatic alcohols such as benzyl alcohol; and N-monosubstituted amides, such as N-methylformamide, N-methylacetamide, cyanoacetamide or 2-pyrrolidinone, for example, or any desired mixtures of such solvents.

The preparation of polyisocyanurate polyisocyanates for the inventive use takes place in accordance with methods known per se, as described for example in the publications stated above in connection with the recitation of suitable catalysts.

In general in this case the starting diisocyanates, optionally under inert gas, such as nitrogen, and optionally in the presence of solvent, examples being those as listed above as possible catalysts solvents inert towards isocyanate groups, are admixed with a suitable catalyst in the quantity stated above at a temperature between 0 and 150° C., preferably 20 to 130° C., more preferably 40 to 120° C., whereafter the reaction to form isocyanurate structures and allophanate structures (where one or more hydroxy-functional compounds are present) begins.

When the desired degree of oligomerization has been reached, the oligomerization is discontinued, with "degree of oligomerization" referring to the percentage of isocyanate groups originally present in the reaction mixture that is consumed during the preparation process, preferably with formation of isocyanurate structures. The minimum target degree of oligomerization may vary as a function of the nature of the starting diisocyanate or mixture of starting diisocyanates used.

Discontinuation of reaction at the target degree of oligomerization may take place, for example, by cooling of the reaction mixture to room temperature. Preferably, however, the reaction is discontinued by addition of a catalyst poison and optional subsequent brief heating of the reaction mixture to a temperature, for example, which is above 80° C.

Examples of suitable catalyst poisons are inorganic acids such as hydrochloric acid, phosphorous acid or phosphoric acid, acyl chlorides such as acetyl chloride, benzoyl chloride or isophthaloyl dichloride, sulfonic acids and sulfonic esters, such as methanesulfonic acid, p-toluenesulfonic acid, trifluoromethanesulfonic acid, perfluorobutanesulfonic acid, dodecylbenzenesulfonic acid, methyl and ethyl p-toluenesulfonate, mono- and dialkyl phosphates such as monotridecyl phosphate, dibutyl phosphate and dioctyl phosphate, but also silylated acids, such as trimethylsilyl methanesulfonate, trimethylsilyl trifluoromethanesulfonate, tris(trimethylsilyl)phosphate and diethyl trimethylsilyl phosphate.

The amount of catalyst poison needed in order to discontinue the reaction is governed by the amount of trimerization catalyst used; generally speaking, an equivalent amount of the catalyst poison is used, based on the catalyst used at the start. If, however, account is taken of any catalyst losses occurring during the reaction, it is also possible for just 20 to 80 equivalent-% of the catalyst poison, based on the amount of catalyst originally employed, to be enough to discontinue the reaction.

The stated catalyst poisons may be used either in bulk or in solution in a suitable solvent. Examples of suitable solvents are the solvents already described above as possible catalyst solvents, or mixtures thereof. The degree of dilution may be selected freely within a very broad range, suitability being possessed, for example, by solutions with a concentration of ≥1 wt %.

Besides the stated solvents, it is also possible for the aforementioned starting diisocyanates to serve as solvents for the catalyst poisons, provided they are sufficiently inert towards isocyanate groups, so that storage-stable solutions can be prepared.

After the end of reaction, the reaction mixture is preferably freed from volatile constituents (such as, for example, from excess starting diisocyanates and any solvents additionally used) by thin-film vacuum distillation, for example at a pressure of below 1.0 mbar, preferably below 0.5 mbar, more preferably below 0.2 mbar, under extremely gentle conditions, as for example at a temperature of 100 to 200° C., preferably of 120 to 180° C.

It is also possible for the stated volatile constituents to be removed from the polyisocyanate by extraction with suitable solvents that are inert towards isocyanate groups, examples being aliphatic or cycloaliphatic hydrocarbons such as pentane, hexane, heptane, cyclopentane or cyclohexane.

In any case, the isocyanuratization and allophanatization reaction is taken at least to a degree of oligomerization which leads to a polyisocyanate suitable for the two-component system of the invention, this polyisocyanate having a fraction of ≤25 wt %, preferably ≤19 wt % of oligomers having a molecular weight ≤780 g/mol.

In another preferred embodiment, the polyisocyanate is obtained by oligomerization of at least one starting diisocyanate to a degree of oligomerization of ≥40%, preferably ≥45% and more preferably ≥50%, based on the isocyanate groups present at the start of the reaction.

For the two-component system of the invention, components A) and B) are used generally in amounts corresponding to an equivalents ration of isocyanate groups to groups that are reactive towards isocyanate groups of 2:1 to 0.5:1, preferably of 1.5:1 to 0.8:1, more preferably of 1.1:1 to 0.9:1.

The two-component systems of the invention can be used very effectively for producing coatings, preferably for producing a soft-touch coating. Characteristics of soft-touch coatings include high elasticity with corresponding tactility. Such use is therefore a further subject of the present invention.

Likewise a subject of the present invention is a method for producing a coating on a substrate, comprising the following steps:
1) providing a substrate;
2) applying at least one two-component system of the invention;
3) curing the two-component system applied in step 2), optionally with supply of heat, wherein the two-component system optionally comprises one or more additives.

As a result of the two-component systems of the invention, a shortened drying time can be achieved in the method of the invention, without the resulting coatings suffering disadvantages in their physicochemical properties.

The optional additives may be present both in component A) and in component B), preferably in effective amounts. Effective amounts are, for solvents, preferably up to 150 wt %, more preferably up to 100 wt % and more particularly up to 70 wt %, based in each case on the non-volatile constituents for the two-component system of the invention. Effective amounts of other additives are preferably up to 25 wt %, more preferably up to 10 wt % and more particularly up to 5 wt %, based in each case on the non-volatile constituents of the two-component system of the invention.

It is optionally possible for further additives, customary within the coatings segment, to be added to the two-component system of the invention. Examples of suitable additives in this context are flow control assistants, colour pigments, fillers, matting agents, organic or inorganic pigments, light stabilizers, coatings additives, such as dispersants, flow control agents, thickeners, defoamers and other auxiliaries, adhesive agents, fungicides, bactericides, stabilizers or inhibitors and catalysts or emulsifiers.

If desired, the two-component system of the invention may also comprise solvents. Suitable solvents are, for example, the customary paint solvents that are known per se, such as ethyl acetate, butyl acetate, ethylene glycol monomethyl or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, more highly substituted aromatics, of the kind available commercially, for example, under the designations solvent naphtha, Solvesso®, Isopar®, Nappar® (ExxonMobil Chemical Central Europe, Cologne, DE) and Shellsol® (Shell Deutschland Oil GmbH, Hamburg, DE), carbonic esters, such as dimethyl carbonate, diethyl carbonate, 1,2-ethylene carbonate and 1,2 propylene carbonate, lactones, such as β-propiolactone, γ-butyrolactone, ε-caprolactone and ε-methylcaprolactone, and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam and water, or any desired mixtures of such solvents.

In a further preferred embodiment, at least one further constituent of component A) of the two-component system of the invention is water. Preferred two-component systems of this kind, containing water as solvent and/or dispersion medium for component A), are notable for particularly advantageous environmental properties.

The coatings which are or which may be produced from the two-component system of the invention and/or by means of the method of the invention are notable for increased chemical resistance in conjunction with equally good soft-touch properties in comparison to the coatings known in the prior art. Accordingly, coatings produced or producible by the method of the invention are a further subject of the present invention.

Also a further subject of the present invention are substrates at least proportionally coated with a coating of the invention. Here it is particularly preferred for the substrate to be an electronic device, an ancillary component from the automotive interior, a flexible packaging item or a solid packaging item. With such substrates, the soft-touch properties are manifested particularly well in combination with the improved chemical resistance.

The inventive and comparative examples which follow are intended to illustrate the invention, but without confining it to these examples.

EXAMPLES

All percentages are by weight, unless indicated otherwise.

The determination of the NCO contents was carried out titrimetrically in accordance with DIN EN ISO 11909:2007-05.

The residual monomer contents were determined gas-chromatographically using an internal standard in accordance with DIN EN ISO 10283:2007-11.

All viscosity measurements were carried out in accordance with DIN EN ISO 3219:1994-10 using a cone/plate measuring instrument. Unless indicated otherwise, measurements were carried out at a temperature of 23° C.

The content of oligomers having a number average molecular weight ≤780 g/mol was determined by gel permeation chromatography in accordance with DIN 55672-1:2016-03 using polystyrene as standard and tetrahydrofuran as eluent.

The König hardness was determined in accordance with DIN EN ISO 1522:2007-04 on glass plates.

Raw Materials

Desmophen 670 BA (Covestro Deutschland AG), hydroxy-functional polyester, 80% in butyl acetate, hydroxyl content 3.5%.

Desmophen C 1200 (Covestro Deutschland AG), linear aliphatic polycarbonate polyester, 100%, hydroxyl content 1.7%.

Bayhydrol U 355 (Covestro Deutschland AG), approx. 55% in water/NMP/DMEA, approx. 42:2:1, aliphatic, hydroxyfunctional polyester polyurethane dispersion, OH content approx. 0.8%

Bayhydrol UH 340/1 (Covestro Deutschland AG), approx. 40% in water, aliphatic anionic polyurethane dispersion.

Impranil DLC-F (Covestro Deutschland AG), approx. 40% in water, ionic/anionic polycarbonate ester polyurethane dispersion.

Desmodur N 3300 (Covestro Deutschland AG), 100% content, aliphatic polyisocyanate, NCO content 21.8%.

Bayhydur 304 (Covestro Deutschland AG), 100% content, hydrophilically modified, aliphatic polyisocyanate based on hexamethylene diisocyanate (HDI), NCO content 18.2%

DBTL, dibutyltin dilaurate (CAS 77-58-7, Aldrich), 10% solution in butyl acetate BYK 333 (Byk Chemie GmbH) wetting agent Glide 410 (Evonik), leveling agent BYK 093 (Byk Chemie GmbH), defoamer DC-51 (Dow Corning), slip-additive Acematt 3300, TS100, OK 607 (Evonik), matting agents Solvents:

BA: butyl acetate

MPA: methoxypropylacetate

X: Xylene

Inventive Polyisocyanate Crosslinkers:

Polyisocyanate 1

A 1 L four-necked flask with stirrer, $N_2$ inlet, condenser, thermometer and drying tube is charged with 840 g (5.0 mol) of hexamethylene diisocyanate (HDI) at 110° C. At the same temperature, 33.5 g (0.25 mol) of trimethylolpropane were added over about 1 h. Stirring was continued for about 2 h until urethanization was complete. When the urethane stage was reached (NCO value of 44.5%), the temperature was lowered to 95° C. For the allophanatization and simultaneous trimerization, a 0.5% trimethylbenzylammonium hydroxide solution in 2-ethylhexanol/2-ethylhexane-1,3-diol, 1:1, was metered in. At an NCO value of 36%, the reaction was ended by addition of 10% dibutyl phosphate solution in HDI in a weight ratio of 100 parts of catalyst to 3 parts of stopping agent. For complete neutralization, stirring was continued at 95° C. for 30 minutes more. The crude solution was subsequently freed from monomeric HDI in a short-path evaporator at 140° C. and <0.1 mbar. Viscosity of the resin after removal of monomeric HDI was 35.000 mPas. The colourless, clear resin, 80% in butyl acetate, had an NCO content of 15.4%, a viscosity of 500 mPas and a monomeric HDI content of <0.3%.

Polyisocyanate 2

A 1 L four-necked flask with stirrer, $N_2$ inlet, condenser, thermometer and drying tube was charged with 630 g (3.75 mol) of hexamethylene diisocyanate (HDI) at 110° C. At the same temperature, 20.1 g (0.15 mol) of trimethylolpropane were added over about 1 h. Stirring was continued for about 2 h until urethanization was complete. When the urethane stage was reached (NCO value of 45.55%), the temperature was lowered to 95° C. For the allophanatization, a 5% Zn octoate solution in 2-ethylhexanol was metered in. Following complete allophanatization (NCO value of 42.65%), the catalyst was stopped with a 5% strength solution of isophthaloyl dichloride in HDI in a weight ratio of 1:1. For complete neutralization, stirring was continued at 100° C. for 30 minutes more. The crude solution was subsequently freed from monomeric HDI in a short-path evaporator at 140° C. and <0.1 mbar. Viscosity of the resin after removal of monomeric HDI was 35.000 mPas. The colourless, clear resin, 80% in butyl acetate, had an NCO content of 15.3%, a viscosity of 540 mPas and a monomeric HDI content of <0.3%.

Polyisocyanate 3

A 1 L four-necked flask with stirrer, $N_2$ inlet, condenser, thermometer and drying tube was charged with 882 g (5.25 mol) of hexamethylene diisocyanate (HDI) at 110° C. At the same temperature, 27.0 g (0.30 mol) of 1,3-butanediol were added over about 1 h. Stirring was continued for about 2 h until urethanization was complete. When the urethane stage was reached (NCO value of 45.75%), the temperature was lowered to 95° C. For the allophanatization, a 5% Zn octoate solution in 2-ethylhexanol was metered in. Following complete allophanatization (NCO value of 43.0%), the catalyst was stopped with a 5% strength solution of isophthaloyl dichloride in HDI in a weight ratio of 1:1. For complete neutralization, stirring was continued at 100° C. for 30 minutes more. The crude solution was subsequently freed from monomeric HDI in a short-path evaporator at 140° C. and <0.1 mbar. The colourless, clear resin, had an NCO content of 19.9%, a viscosity of 3250 mPas/23° C. and a monomeric HDI content of <0.3%.

Polyisocyanate 4

A 1 L four-necked flask with stirrer, $N_2$ inlet, condenser, thermometer and drying tube was charged with 770 g (5.0 mol) of pentamethylene diisocyanate (PDI) at 110° C. At the same temperature, 33.5 g (0.25 mol) of trimethylolpropane were added over about 1 h. Stirring was continued for about 2 h until urethanization was complete. When the urethane stage was reached (NCO value of 48.35%), the temperature was lowered to 95° C. For the allophanatization and simultaneous trimerization, a 1.5% trimethylbenzylammonium hydroxide solution in 2-ethylhexanol/2-ethylhexane-1,3-diol, 1:1, was metered in. At an NCO value of 39.5%, the reaction was ended by addition of a 10% dibutyl phosphate solution in PDI in a weight ratio of 100 parts of catalyst to 7.5 parts of stopping agent. For complete neutralization, stirring was continued at 95° C. for 30 minutes more. The crude solution was subsequently freed from monomeric PDI in a short-path evaporator at 140° C. and <0.1 mbar. Viscosity of the resin after removal of monomeric HDI was 60.000 mPas. The colourless, clear resin, 80% in butyl acetate, had an NCO content of 16.2%, a viscosity of 1150 mPas and a monomeric PDI content of <0.3%.

Non-Inventive Polyisocyanates

Polyisocyanate 5 was prepared according to EP 1445271, example 2.

Polyisocyanate 6 was prepared according to EP 1445271, example 3. Instead of Excenol 1030, a poly(propyleneoxide) polyether with following data was used: Mw (weight average) 1020 g/mol; OH-number 150 mg KOH/g; viscosity 300 mPas, functionality 3.

Examples for Solvent Borne Two-Component Systems

Preparation of Component A

Composition of polyol blends were prepared by introducing the ingredients set forth in table 1 below. Desmophen 670 BA and Desmophen C 1200 were placed into a vessel, DBTL, BYK333, Glide 410 were added into the vessel and dispersed at 1,000 rpm (~2.1 m/s) for about 10 min. Eventually, Acematt 3300 was added in 4 steps and dispersed at 2000 rpm (~4.2 m/s) for about 30 min.

TABLE 1

Composition of the polyols 1 to 4

| | polyol 1 | polyol 2 | polyol 3 | polyol 4 |
|---|---|---|---|---|
| Desmophen 670 BA | 19.2 | 19.2 | 19.2 | 19.2 |
| Desmophen C 1200 | 15.3 | 15.3 | 15.3 | 15.3 |
| DBTL, 10% in BA | 0.6 | 0.4 | 0.2 | 0.0 |
| BYK 333 | 0.4 | 0.4 | 0.4 | 0.4 |
| Glide 410 | 0.4 | 0.4 | 0.4 | 0.4 |
| Acematt 3300 | 4.0 | 4.0 | 4.0 | 4.0 |
| MPA/BA/Xy (1:1:1) | 28.4 | 28.4 | 28.4 | 28.4 |
| Total polyol | 68.3 | 68.1 | 67.9 | 67.7 |

Preparation of Component B

Crosslinkers 1-9 were prepared by introducing the ingredients according to table 2 below.

TABLE 2

Crosslinkers 1-9

| | Crosslinker | | | | | | |
|---|---|---|---|---|---|---|---|
| | 1 (comp.) | 2 (inv.) | 3 (inv.) | 4 (inv.) | 5 (inv.) | 6 (inv.) | 7 (inv.) |
| Desmodur N 3300 | 100 | | | | | 30 | 24.15 |
| polyisocyanate 1 | | 100 | | | | | |
| polyisocyanate 2 | | | 100 | | | | 75.85 |
| polyisocyanate 3 | | | | 100 | | 70 | |
| polyisocyanate 4 | | | | | 100 | | |
| NCO wt.-% | 21.8 | 18.02 | 15.3 | 19.9 | 16.2 | 20.47 | 16.87 |
| mol allophanate/mol free isocyanate* | 0 | 0.41 | 0.51 | 0.47 | 0.41 | 0.41 | 0.41 |
| mol isocyanurate/mol free isocyanate* | 0.37 | 0.15 | 0.03 | 0.03 | 0.15 | 0.15 | 0.15 |

TABLE 2-continued

Crosslinkers 1-9

| | Crosslinker | |
|---|---|---|
| | 8 (comp.) | 9 (comp.) |
| polyisocyanate 5 | 100 | |
| polyisocyanate 6 | | 100 |
| NCO wt.-% | 20.6 | 15.2 |

* From $^{13}$C NMR spectra, calculated as molar ratio of allophanate and isocyanurate groups over free isocyanate groups Preparation of the Two-Component-Systems Component A and component B (NCO:OH equivalent ratio 1.1:1) were mixed under stirring by hand for 2 minutes prior to application. The coating compositions were then applied to PC/ABS (white and black), glass and aluminium substrates via conventional spray equipment to a dry film thickness of 40 to 50 µm. The samples were flashed off under ambient condition (23° C.) for 5 min, force dried at 60° C. for 30 min and then stored at 23° C. and 50% relative humidity for 1 week prior to testing.

TABLE 3

Solvent borne two-component-systems

| | polyol 1 (68.3 g) | polyol 2 (68.1 g) | polyol 3 (67.9 g) | polyol 4 (67.7 g) |
|---|---|---|---|---|
| Crosslinker 1 (comparison) | 11.6 g | 11.6 g | 11.6 g | 11.6 g |
| Crosslinker 2 (inventive) | 16.4 g | 16.4 g | 16.4 g | 16.4 g |
| Crosslinker 3 (inventive) | | 16.5 g | | |
| Crosslinker 4 (inventive) | | 12.7 g | | |
| Crosslinker 5 (inventive) | | 15.6 g | | |
| Crosslinker 6 (inventive) | | 12.3 g | | |
| Crosslinker 7 (inventive) | | 15.0 g | | |
| Crosslinker 8 (inventive) | | 12.3 g | | |
| Crosslinker 9 (inventive) | | 16.6 g | | |

Evaluation of the Coating Films Based on the Solvent Borne Two-Component-Systems:

Impression Mark Test: Test of Initial Curing Speed

Immediately after baking at 60° C. for 30 min and cooling to 23° C. for 45 min, a weight of 500 g over a plastic film was placed on top of the films for 30 min. After removal of both weight and plastic film, appearance was checked immediately. The results can be seen in table 4 (rating: 0=poor, excessive marks; 5=best, no signs of marks). Those coatings cured with the inventive crosslinker 2 showed significantly less thermoplasticity, as a result of faster initial curing.

TABLE 4

Impression mark test of crosslinkers 1-2 and polyols 1-4

| | polyol 1 | polyol 2 | polyol 3 | polyol 4 |
|---|---|---|---|---|
| Crosslinker 1 (comparison) | 5 | 5 | 3 | 1 |
| Crosslinker 2 (inventive) | 5 | 5 | 5 | 3 |
| Crosslinker 8 (comparison) | | 5 | | |
| Crosslinker 9 (comparison) | | 5 | | |

Drying Speed:

After application, coatings were allowed to flash off and cured at 60° C. as described above, then cooled down to 23° C. for 10 min. Then, a 200 g load with paper was placed on top for 30 seconds, and then the load was carefully removed. The panel was turned upside down to see if the paper automatically falls down or not. If the paper falls automatically down the drying test is successfully passed. Otherwise, the paper still sticks to the coating (not passed). The results are shown in table 5.

TABLE 5

Drying properties of crosslinkers 1-7 and polyol 2

| | Crosslinker | | | | | | |
|---|---|---|---|---|---|---|---|
| | 1 (comparison) | 2 | 3 | 4 | 5 | 6 | 7 |
| polyol 2 | Tacky | Pass | Pass | Tacky | Pass | Tacky | Pass |

Abrasion Resistance:

Abrasion resistance of the coating was tested by a Tabor abrasion tester, using a load of 1,000 g, CS-10 wheels for 500 cycles and 1,000 cycles, and finally checking the weight loss (less weight loss means better abrasion resistance). The results can be seen in table 6.

TABLE 6

Abrasion resistance of crosslinkers 1-9 and polyol 2

| | Crosslinker | | | | | | | | |
|---|---|---|---|---|---|---|---|---|---|
| | 1 (comparison) | 2 | 3 | 4 | 5 | 6 | 7 | 8 | 9 |
| 500 cycles/mg | 48 | 4 | 17 | 16 | 5 | 30 | 9 | 53 | 64 |
| 1 000 cycles/mg | 81 | 22 | 45 | 42 | 32 | 49 | 41 | 97 | 126 |

MEK Resistance:

The MEK solvent resistance of the coating was tested by placing a drop of MEK (0.1 ml) on the coating film and checking how many minutes passed until the coating film was dissolved by MEK (longer period means better solvent resistance). The results are shown in table 7.

TABLE 7

| | Crosslinker | | | | | | | | |
|---|---|---|---|---|---|---|---|---|---|
| | 1 (comp.) | 2 | 3 | 4 | 5 | 6 | 7 | 8 | 9 |
| Film destroyed after | 16 min | 26 min | 26 min | 20 min | 22 min | 18 min | 20 min | 17 min | 12 min |

MEK solvent resistance crosslinkers 1-9 and polyol 2

Suntan Lotion and DEET Resistance:

The suntan lotion and insect repellent (DEET, 8.0%) resistance of the coating was tested by placing 0.2 ml of NIVEA SPF 30+PA++ suntan lotion on a 2 inch square, and then placing the coated panel into a climate chamber (60° C., 95% humidity) for 48 hours. After the test, the panels were cooled to 23° C. Next, the residual suntan lotion/DEET was removed with a tissue paper and the appearance was visually checked: 5 is the best (unchanged), 1 is the worst (totally destroyed). Finally, cross cut adhesion was measured (3M tape #600). The results can be seen in table 8 and table 9.

TABLE 8

Suntan lotion resistance of crosslinkers 1-9 and polyol 2

| | Crosslinker | | | | | | | | |
|---|---|---|---|---|---|---|---|---|---|
| | 1 (comp.) | 2 | 3 | 4 | 5 | 6 | 7 | 8 (comp.) | 9 (comp.) |
| Appearance | 3 | 4 | 4 | 4 | 3 | 3 | 3 | 3 | 3 |
| Adhesion | 100/100 | 100/100 | 100/100 | 100/100 | 100/100 | 100/100 | 100/100 | 100/100 | 100/100 |

TABLE 9

DEET resistance of crosslinkers 1-9 and polyol 2

| | Crosslinker | | | | | | | | |
|---|---|---|---|---|---|---|---|---|---|
| | 1 (comp.) | 2 | 3 | 4 | 5 | 6 | 7 | 8 (comp.) | 9 (comp.) |
| Appearance | 2 | 4 | 1 | 1 | 1 | 1 | 1 | 1 | 1 |
| Adhesion | 100/100 | 100/100 | 100/100 | 100/100 | 100/100 | 100/100 | 100/100 | 100/100 | 100/100 |

Examples for Water Borne Two-Component-Systems

Preparation of Component A

Composition of polyol 5 was prepared by introducing the ingredients shown in table 10. The polyurethane dispersions Bayhydrol U 355, Bayhydrol UH 340/1 and Impranil DLC-F were placed in a vessel, BYK348, BYK 093, DC-51 were added into the vessel sequentially, and dispersed at 1,000 rpm for about 10 min. OK607 and TS100 were added into the vessel stepwise and then dispersed at 2000 rpm during 30 min.

TABLE 10

Composition of polyol 5

| | Polyol 5 |
|---|---|
| Bayhydrol U 355 | 32.6 |
| Bayhydrol UH 340/1 | 29.8 |
| Impranil DLC-F | 15 |
| Deionized water | 15.2 |
| BYK 093 | 0.5 |
| BYK 348 | 0.4 |

TABLE 10-continued

Composition of polyol 5

| | Polyol 5 |
|---|---|
| DC-51 | 1 |
| OK 607 | 1.5 |
| TS 100 | 4 |
| Total | 100.00 |

Preparation of Component B

TABLE 11

Compositions of crosslinkers 10 and 11 (parts by weight)

|  | Crosslinker 10 (comparative) | Crosslinker 11 (inventive) |
| --- | --- | --- |
| Bayhydur 304 (comparative) | 100 | 50 |
| polyisocyanate1 (inventive) |  | 59.1 |

Evaluation of the Coating Films Based on the Water Borne Two-Component-Systems:

TABLE 12

Water borne two-component-systems (parts by weight)

|  | polyol 5 (100 g) | polyol 5 (100 g) |
| --- | --- | --- |
| Crosslinker 10 | 5.6 |  |
| Crosslinker 11 |  | 6.1 |

The coating compositions according to table 12 were applied to polycarbonate/acrylonitrile-butadiene-styrene (PC/ABS) white & black, glass and Aluminium substrates via conventional spray equipment to a dry film thickness of 40 to 50 μm. The samples were allowed to flash off under ambient conditions for 5 min, baked at 60° C. for 30 min and then returned to ambient condition for 1 week prior to testing.

Impression Mark Test:

After the coating film was baked at 60° C. for 30 min, cooling to ambient temperature during 45 min, a weight of 500 g on plastic package film was applied at R.T. for 30 min, then appearance was checked immediately after testing (see table 13). The panel was evaluated in a range between 0=poor, excessive marks and 5=best, no signs of marks.

TABLE 13

Impression mark test of coating compositions of polyol 5 and crosslinker 10 and 11

| Crosslinker | Crosslinker 10 (comparative) | Crosslinker 11 (inventive) |
| --- | --- | --- |
| Impression mark test | 2 | 3 |

RCA Resistance Test:

An R.C.A abrasion wear tester with 175 g load was used. After 200 cycles, appearance of the test areas was checked visually: 5 is best, 1 is worst (see table 14).

TABLE 14

RCA test of coating compositions of polyol 5 with crosslinkers 10 and 11

| Crosslinker | Crosslinker 10 (comparative) | Crosslinker 11 (inventive) |
| --- | --- | --- |
| RCA result | 1 | 3 |

Abrasion Resistance:

Abrasion resistance of the coating was tested by a Taber abrasion tester, using a load of 1,000 g, CS-10 wheels for 500 cycles and 1,000 cycles, and finally checking the weight loss (less weight loss means better abrasion resistance). The results are shown in table 15.

TABLE 15

Abrasion resistance of coating compositions of polyol 5 and crosslinkers 10 and 11

| Crosslinker | Crosslinker 10 (comparative) | Crosslinker 11 (inventive) |
| --- | --- | --- |
| 500 cycles/mg | 89 | 70 |
| 1000 cycles/mg | 221 | 200 |

Ethanol Resistance:

The ethanol resistance of the coating was tested by placing a drop of ethanol (0.1 ml) on the coating film, then checking appearance after 5 min & 10 min. The results are shown in table 16.

TABLE 16 ethanol resistance of coating compositions of polyol 5 and crosslinkers 10 and 11

| Crosslinker | Crosslinker 10 (comparative) | Crosslinker 11 (inventive) |
| --- | --- | --- |
| ethanol-5 min | slight trace | pass |
| ethanol-10 min | slight trace | very slight trace |

DEET Resistance:

The insect repellent (DEET, 8.0%) resistance of the coating was tested by placing 0.2 ml of DEET on a 2 inch square, and then placing the coated panel into a climate chamber (60° C., 95% humidity) for 24 hours. After the test, the panels were cooled to 23° C. Next, the residual suntan lotion/DEET was removed with a tissue paper and the appearance was visually checked: 5=best (unchanged), 1=worst (totally destroyed). The results are shown in table 17.

TABLE 17

DEET resistance of polyol 5 and crosslinkers 10 and 11

| Crosslinker | Crosslinker 10 (comparative) | Crosslinker 11 (inventive) |
| --- | --- | --- |
| Appearance | 2/blisters | 4/very slight blisters |

As a summary, it could be proven that using the inventive polyisocyanate crosslinkers and especially the inventive two-component-systems, in solvent—as well as water borne formulations results in faster drying and better chemical resistance, while elasticity/abrasion resistance is kept on the same or even higher level. Non inventive, allophanate polyisocyanates without isocyanurate groups (polyisocyanates 5 and 6) show a high level of elasticity/abrasion resistance, however fail to meet the required chemical resistance.

The invention claimed is:

1. A two-component system comprising
    component A) comprising at least one polymeric polyol which has an OH content of ≤4.5 wt %, based on the total solids content of the polymeric polyol, and
    component B) comprising at least one polyisocyanate which has a number average isocyanate group functionality of >5.0 to <10.0, based on the total solids content of the polyisocyanate, a fraction of ≤25 wt %, based on the total solids content of the polyisocyanate, of oligomers containing isocyanate groups and having a number-average molecular weight of ≤780 g/mol, an isocyanurate group fraction of ≥5 mol % to ≤70 mol %, based on the sum of amounts of isocyanurate groups and allophanate groups in the polyisocyanate, and wherein the polyisocyanate is obtained by oligomerization of at least one aliphatic, cycloaliphatic or araliphatic monomeric diisocyanate having a molecular weight of ≥140 to ≤400 g/mol and at least one hydroxy-functional compound having an OH functionality of >2 and ≤6 and a molecular weight of ≥130 to ≤500 g/mol in the presence of a catalyst.

2. The two-component system according to claim 1, wherein the polyisocyanate comprises at least one oligomer which contains one or more isocyanurate groups and one or more allophanate groups, which in each case are joined chemically to one another via an aliphatic, cycloaliphatic or araliphatic group having a molecular weight of ≥56 to ≤316 g/mol.

3. The two-component system according to claim 1, wherein the number average isocyanate group functionality is >5.0 to ≤8.0, based on the total solids content of the polyisocyanate.

4. The two-component system according claim 1, wherein the fraction of the oligomers containing isocyanate groups and having a number-average molecular weight of ≤780 g/mol is ≤22 wt %, based on the total solids content of the polyisocyanate.

5. The two-component system according to claim 1, wherein the fraction of isocyanurate groups is ≥10 mol % to ≤60 mol %, based on the total amount of isocyanurate groups and allophanate groups in the polyisocyanate.

6. The two-component system according claim 1, wherein the polyisocyanate has a fraction of allophanate groups of ≥30 mol % to ≤95 mol %, based on the total amount of isocyanurate groups and allophanate groups in the polyisocyanate.

7. The two-component system according to claim 2, wherein the one or more isocyanurate groups and one or more allophanate groups of the oligomer are each joined chemically to one another via a linear or branched aliphatic group in the molecular weight range from ≥56 to ≤316 g/mol, via a 1,5-pentyl or 1,6-hexyl group.

8. The two-component system according to claim 1, wherein the hydroxy-functional compound has an OH functionality of ≥3 and ≤5 and a molecular weight of ≥130 to ≤500 g/mol.

9. The two-component system according to claim 1, wherein the polymeric polyol present at least in component A) is a polycarbonate polyol.

10. The two-component system according to claim 1, wherein component A) consists of ≥30 wt %, of the polymeric polyol, based on the total weight of component A), and the balance to 100 wt % is composed of one or more polymeric polyester, polyether and/or polycarbonate polyols which are different from the polymeric polyol, and also, optionally, of one or more additives.

11. The two-component system according to claim 1, wherein a further constituent of component A) of the two-component system is water.

12. A method for producing a coating on a substrate, comprising the following steps:
1) Providing a substrate;
2) Applying at least one two-component system according to claim 1;
3) Curing the two-component system applied in step 2), optionally with supply of heat,
wherein the two-component system optionally comprises one or more additives.

13. The coating produced or producible by the method according to claim 12.

14. A substrate at least partially coated with the coating according to claim 13.

15. The two-component system according to claim 1, wherein component A) consists of ≥30 and ≤50 wt %, of the polymeric polyol, based on the total weight of component A), and the balance to 100 wt % is composed of one or more polymeric polyester, polyether and/or polycarbonate polyols which are different from the polymeric polyol, and also, optionally, of one or more additives.

* * * * *